ic patent office 3,148,184
Patented Sept. 8, 1964

3,148,184
6,7-DIHALOGENATED CORTICOIDS
David H. Gould, Leonia, and Elliot L. Shapiro, Cedar Grove, N.J., assignors to Schering Corporation, Bloomfield, N.J., a corporation of New Jersey
No Drawing. Filed Nov. 30, 1962, Ser. No. 241,176
20 Claims. (Cl. 260—239.55)

This invention relates to a novel group of steroid intermediates (and to processes for their manufacture) which are useful in the preparation of 6-halogeno-1,4,6-pregnatrienes and the 1,2-dihydro analogs thereof, said pregnatrienes and analogs being more specific in their anti-inflammatory action than previously known anti-inflammatory drugs.

In our co-pending application Serial No. 785,326, filed January 7, 1959, of which this application is a continuation in part we disclose and claim new compounds of the group represented by the following formula:

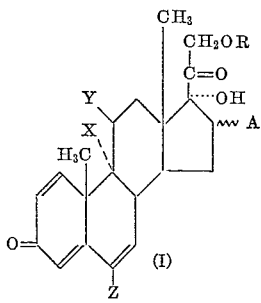

wherein X is a member of the group consisting of H, and halogen of atomic weight less than 126; Y is a member of the group consisting of O and (H,βOH); Z is a halogen of atomic weight less than 126; R is a member of the group consisting of H and lower alkanoyl; and A is a member of the group consisting of H and lower alkyl; and the 1,2-dihydro analogs thereof.

Compounds of Formula I exhibit a rather narrow spectrum of cortical activity with a concurrent enhancement of the anti-inflammatory property. We have discovered that these 6-halogenated 6-unsaturated corticoids have physiological properties which have been drastically and unexpectedly modified from the parent 6-dehydrocorticoids.

6-dehydroprednisone acetate is known to be an active anti-arthritic corticosteroid similar to cortisone, both of which cause thymus involution in animals and in both animals and humans cause eosinopenia and liver glycogen deposition as well as a reduction in inflammation. On the other hand, 6-bromo-6-dehydroprednisone acetate of our invention is devoid of activities other than anti-inflammatory, and thus is valuable in not causing extraneous physiological effects so that full benefit may be derived from the anti-inflammatory activity.

In like manner, the 6-halogeno-4,6-pregnadienes of the above formula are more specific in anti-inflammatory acitvity than their non-6-halogenated analogs by concomitantly being devoid of extraneous undesirable effects.

The increase in the anti-inflammatory action of the 6-halogenated-4,6-pregnadienes over that of their non-halogenated counterparts is surprising in view of recent clinical findings (Oliveto et al., J.O.C. 22, 1720 (1957)) which indicate that in the 1,4-pregnadiene series, the metabolic effects in man are considerably diminished by the substitution of a halogen atom for a hydrogen atom at C-4.

The therapeutic end products of Formula I are prepared as outlined below wherein A, X, Y, Z and R have the same meanings given above and Z' is a halogen. The dotted line between the 1 and 2 carbon atoms indicates that the procedure is applicable to the 4,6-pregnadienes and 1,4,6-pregnatrienes of Formula I.

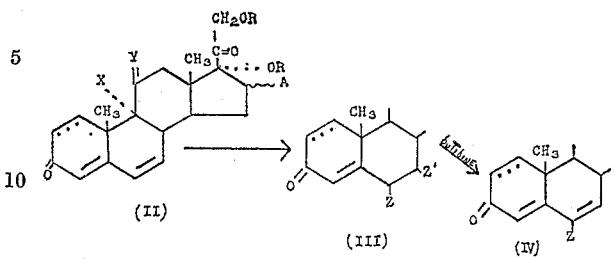

The 4,6-pregnadiene (or triene) starting compounds, II, may be prepared directly from the corresponding 4-pregnene 21-acetate by dehydrogenation with an agent such as chloranil in refluxing zylene, or by halogenating 4-pregnene 21-acetate with agents such as N-bromosuccinimide, N-chlorosuccinimide, and the like, followed by subsequent dehydrohalogenation in refluxing collidine or lutidine. Thus, for example, treatment of cortisone 21-acetate with N-bromosuccinimide yields 6-bromocortisone 21-acetate which is dehydrobrominated in refluxing lutidine to yield 6-dehydrocortisone.

In like manner, 4.6-pregnadienes, II, wherein A is a lower alkyl group are obtained from the corresponding 16-alkyl-4-pregnene 21 acetates which are prepared as described by Rausser et al., in their copending application Serial No. 733,843, filed May 8, 1958.

The dihalogenated intermediates, III, wherein Z and Z' are identical, are obtained from the corresponding 4,6-pregnadienes, II, by known halogenating procedures, using halogens such as bromine or chlorine. Reagents such as iodine monochloride, bromine monochloride, and the like produce intermediates, III, wherein Z and Z' are different. Examples of such intermediates are the 6-chloro-7-iodo and the 6-chloro-7-bromo-4-pregnenes. Mixed dihalogenation may also be accomplished by adding to the 4,6-pregnadienes a series of halogenating reagents under proper conditions. For example, hydrogen fluoride in methylene chloride in admixture with 6-dehydrocortisone 21-acetate followed by addition of N-bromoacetamide in methylene chloride yields 6-fluoro-7-bromo-4-pregnene 21-acetate. Dehydrohalogenation of the 6,7-dihalogeno-4-pregnenes, III, yields the novel 6-halogeno-4,6-dienes by treatment with a base such as collidine, lutidine, dimethylformamide or diethylformamide, with or without the presence of calcium or sodium carbonate for neutralizing the release acid.

It is preferable, generally, to protect any primary or secondary hydroxyl group which may be present, such as at the 11- or 21-position. This may be accomplished by esterifying the hydroxyl groups in the usual manner or by preservation of the 11-hydroxy in the form of the 9β,11β-epoxide. The esters may ultimately be saponified to the free alcohols of Formula I, by known techniques.

The 6-halogenated pregnatrienes of Formula I may be prepared from the sequences of reactions similar to those whereby the 6-halogeno-4,6-pregnadienes are prepared. Thus, for example, 6-dihydroprednisone acetate is brominated to give 6,7-dibromoprednisone 21-acetate intermediate which, on treatment with a base such as lutidine yields 6-bromo-1,4,6-pregnatriene 21-acetate of our invention.

The 1,4,6-pregnatriene starting compounds, the 1-dehydro analogs of II, may be prepared directly from the corresponding known 1,4-pregnadiene 21-acetates by dehydrogenation with an agent such as chloranil in refluxing xylene; or by the allylic halogenation of a 3-keto-1,4-pregnadiene 21-acetate with agents such as N-bromosuccinimide, N-chlorosuccinimide to form the corresponding the 3-keto-6-halogeno-1,4-pregnadiene which is subsequently dehydrohalogenated to refluxing collidine or lutidine.

1,4-pregnadiene compounds containing a 16-alkyl substituent may be prepared as described by Rausser et al., supra. The 16-alkylated-1,4-pregnadienes are then converted to the 16-alkyl-1,4,6-pregnatrienes and thence to the 6-halogeno-pregnatrienes by processes analogous to those indicated above.

The following examples are illustrative of the procedures employed in preparing the compounds of this invention but are not to be construed as limiting the scope thereof; the scope of our invention being limited only by the appended claims.

EXAMPLE 1

6-Bromo-6-Dehydrocortisone 21-Acetate

The requisite intermediate, 6,7-dibromocortisone 21-acetate, is prepared from 6-dehydrocortisone 21-acetate in the following manner. Four grams of 6-dehydrocortisone acetate are dissolved in 80 ml. of methylene chloride under argon gas and 1.7 g. of bromine in 3 ml. of methylene chloride is added. The solution decolorizes rapidly and is poured into water after two minutes, extracted with methylene chloride, then washed to neutrality with water. The solution is dried over magnesium sulfate, filtered, and evaporated to dryness in vacuo. Hexane is added to the residue and the mixture then re-evaporated to give a solid residue of 6,7-dibromocortisone 21-acetate.

To the dibromide prepared above there is added, under argon gas, 60 ml. of 2,4-lutidine. The mixture is refluxed 20 minutes, cooled, then poured into an excess of dilute sulfuric acid, and the acidic mixture extracted with methylene chloride. The organic solution is washed with water, dried over magnesium sulfate and evaporated in vacuo. The resulting residue is crystallized from acetone-hexane to yield 6-bromo-6-dehydrocortisone 21-acetate, M.P. 244° C.

EXAMPLE 2

6-Bromo-6-Dehydrohydrocortisone 21-Acetate

The requisite intermediate, 6,7-dibromohydrocortisone 21-acetate, is prepared from 5 g. of 6-dehydrocortisone 21-acetate and 2.25 g. of bromine in the manner described in Example 1.

To the resulting dibromide is added 100 ml. of dimethylformamide and the mixture is refluxed 30 minutes. The solution is evaporated in vacuo to a solid residue which is crystallized from acetone to yield 6-bromo-6-dehydrohydrocortisone 21-acetate.

EXAMPLE 3

6-Chloro-6-Dehydrocortisone 21-Acetate

The requisite intermediate, 6,7-dichlorocortisone 21-acetate, is prepared from 2 g. of 6-dehydrocortisone 21-acetate and 0.38 g. of chlorine in methylene chloride in the manner described in Example 1.

The dichloride prepared above is dissolved in 50 ml. of 2,4,6-collidine and heated for 3 hours at 90–95° C. The product is isolated in the manner of Example 1 to give 6-chloro-6-dehydrocortisone 21-acetate which is crystallized from acetone-hexane.

EXAMPLE 4

6-Fluoro-6-Dehydrocortisone 21-Acetate

The requisite intermediate, 6-fluoro-7-bromocortisone 21-acetate, is prepared in the following manner. Methylene chloride (60 ml.) saturated with hydrogen fluoride is added dropwise at room temperature to a stirred solution of 6-dehydrocortisone 21-acetate (1 g.) and N-bromoacetamide (0.395 g.) in freshly distilled methylene chloride (20 ml.). After the addition is completed, the reaction mixture is stirred for two hours at room temperature. The solution is then diluted with an additional 500 ml. of methylene chloride, washed with water until neutral, dried over magnesium sulfate, filtered, and evaporated to dryness, in vacuo, yielding a residue of 6-fluoro-7-bromocortisone 21-acetate. This is used without further purification in the following procedure.

The 6-fluoro-7-bromocortisone 21-acetate is reacted with 2,4-lutidine under argon gas, in the manner of Example 1. The isolated crude product is chromatographed on activated magnesium silicate. The fractions eluted with 50–75% ether-in-hexane are combined and crystallized from acetone-hexane to give 6-fluoro-6-dehydrocortisone 21-acetate.

EXAMPLE 5

6-Bromo-6-Dehydrohydrocortisone 11,21-Diacetate

First, 6-bromohydrocortisone 11,21-diacetate, is prepared from hydrocortisone 11,21-diacetate (8.9 g.) in one liter of chlorobenzene and one liter of carbon tetrachloride to which is added 3.7 g. of freshly crystallized N-bromosuccinimide under an atmosphere of nitrogen. The refluxing solution is illuminated with an incandescent lamp (RFL No. 2) until the reaction solution is negative to starch iodide paper. The solution is then chilled, washed with water, dried over magnesium sulfate, filtered, and concentrated in vacuo. The resulting residue is substantially 6-bromohydrocortisone 11,21-diacetate.

Without further purification, the 6-bromohydrocortisone 11,21-diacetate prepared above is dissolved in 200 ml. of 2,4-lutidine and refluxed for two hours. The solution is then chilled, poured into ice and water containing enough sulfuric acid to neutralize the excess lutidine, and extracted with methylene chloride. The organic layer is washed with water, dried over magnesium sulfate, filtered and concentrated in vacuo. The resulting residue is chromatographed over magnesium silicate. Elution with 40% to 80% ether-in-hexane, and concentration of the eluates yields 6-dehydrohydrocortisone 11,21-diacetate.

To 2.2 g. of above prepared 6-dehydrohydrocortisone 11,21-diacetate dissolved in 80 ml. of methylene chloride under argon, there is added a drop of hydrogen bromide in acetic acid followed by the dropwise addition of 0.85 g. of bromine in 3 ml. of methylene chloride within 45 minutes at room temperature. The reaction solution is then poured into water and extracted with methylene chloride. The organic layer is washed with water, dried over magnesium sulfate, filtered, and evaporated in vacuo to yield 6,7-dibromohydrocortisone 11,21-diacetate.

Without further purification the dibromide-diacetate prepared immediately above is dissolved in 2,4-lutidine (60 ml.) and refluxed for 30 minutes. The reaction mixture is cooled, poured into dilute acid sufficient to neutralize any excess lutidine, and extracted with methylene chloride. The organic solution is washed with water, dried over magnesium sulfate, filtered, and evaporated in vacuo. The residue is crystallized from acetone-hexane to give 6-bromo-6-dehydrohydrocortisone 11,21-diacetate.

EXAMPLE 6

6-Bromo-9α-Fluoro-6-Dehydrohydrocortisone 21-Acetate 6,7-dibromo-9α-fluorohydrocortisone 21-acetate is prepared by reacting 9α-fluoro-6-dehydrohydrocortisone 21-acetate (2.1 g.) with hydrogen bromide and with bromine (0.85 g.) in the manner of Example 5 which is then further reacted with 60 ml. 2,4-lutidine in the manner of Example 1 to give 6-bromo-9α-fluoro-6-dehydrohydrocortisone 21-acetate.

EXAMPLE 7

6-Bromo-6-Dehydrocortisone 21-n-Butyrate

In the manner of Example 5, cortisone 21-butyrate is reacted with N-bromosuccinimide to form the necessary intermediate, 6-bromocortisone 21-butyrate, which in turn, is reacted with 2,4-lutidine to give 6-dehydrocortisone 21-butyrate.

6-dehydrocortisone 21-butyrate (2 g.) is reacted with bromine (0.83 g.) in the manner of Example 5 to yield 6,7-dibromocortisone 21-butyrate.

Without further purification, the dibromo-21-butyrate prepared above is reacted with 60 ml. of 2,4-lutidine in the manner of Example 5 to yield 6-bromo-6-dehydrocortisone 21-butyrate which is recrystallized from acetone-hexane.

EXAMPLE 8

*6-Chloro-9α-Bromo-6-Dehydrohydrocortisone 21-Acetate*

6-bromo-9β,11β - epoxy - 17,α,21 - dihydroxy-4-pregnene-3,20-dione 21-acetate is prepared in the manner of Example 5 from 9β,11β-epoxy-17α,21-dihydroxy-4-pregnene-3,20-dione 21-acetate and N-bromosuccinimide.

The crude 6-bromo-9β,11β-epoxy intermediate thus prepared is dissolved in 200 ml. of 2,4-lutidine and reacted in the manner of Example 5 to give 9β,11β-epoxy-17α,21 - dihydroxy-4,6-pregnadiene-3,20-dione 21-acetate.

The 9β,11β-epoxy-4,6-pregnadiene (2 g.) prepared above is dissolved in methylene chloride and added to a solution of 0.87 g. of iodine monochloride in methylene chloride under argon. After the reaction has proceeded as evidenced by lightening of the color, the solution is poured into water and extracted with methylene chloride. The organic solvent layer is washed to neutrality with water, dried over magnesium sulfate, filtered, and evaporated in vacuo to yield a solid residue of the requisite intermediate, 6-chloro-7-iodo-9,11-epoxy-17α,21-dihydroxy-4-pregnene 21-acetate.

Without further purification, the 6-chloro-7-iodo-4-pregnene is dissolved in 200 ml. of 2,4-lutidine and refluxed 30 minutes, then evaporated in vacuo to a solid residue which is crystallized from aqueous acetone to yield 6-chloro-9β,11β-epoxy-17α,21-dihydroxy - 4,6-pregnadiene-3,20-dione 21-acetate.

One gram of 6-chloro-9β,11β-epoxy-17α,21-dihydroxy-4,6-pregnadiene 21-acetate is dissolved in 20 ml. carbon tetrachloride and 20 ml. of glacial acetic acid, and 0.63 ml. of 4-Normal hydrobromic acid in acetic acid is added while maintaining a reaction mixture temperature of approximately 15° C. Twenty minutes after the addition is complete, the solution is diluted with 50 ml. of methylene chloride and washed to neutrality with water. The organic solvent layer is dried over magnesium sulfate, filtered, and evaporated in vacuo to a residue which is crystallized and recrystallized from acetone-hexane to give 6-chloro-9α-bromo-6-dehydrohydrocortisone 21- acetate.

EXAMPLE 9

*6-Bromo-9α-Chloro-6-Dehydrohydrocortisone 21-Acetate*

6,7-dibromo-9β,11β-epoxy - 17α,21 - dihydroxy-4-pregnene- 3,20-dione 21-acetate, is prepared in the manner of Example 1 from 9β,11β-epoxy-17α,21-dihydroxy-4,6-pregnadiene-3,20-dione 21-acetate and bromine.

The crude 6,7-dibromide thus prepared is dissolved in 100 ml. of acetone and 4 grams of potassium acetate added. The reaction mixture is refluxed 20 hours, then evaporated to dryness. The resultant residue is triturated with water, filtered, washed further with water, dried, then crystallized from acetone to give 6-bromo-9β,11β-epoxy-17α,21-dihydroxy-4,6-pregnadiene-3,20-dione 21-acetate.

A solution of one gram of 6-bromo-9β,11β-epoxy-17α,21-dihydroxy-4,6-pregnadiene-3,20-dione 21-acetate in 20 ml. of freshly distilled chloroform is cooled to −25° C. To this is added 6.3 ml. of a 0.4 normal solution of hydrogen chloride in chloroform also cooled to −25° C. The reaction mixture is allowed to stand at 0° C. for two hours, and is then extracted with water to neutrality. The organic solvent layer is concentrated to dryness and the residue crystallized and recrystallized from acetone to give 6-bromo-9α-chloro-6-dehydrohydrocortisone 21-acetate.

EXAMPLE 10

*6-Bromo-6-Dehydroprednisone 21-Acetate*

6,7-dibromoprednisone 21-acetate is prepared from 6-dehydroprednisone 21-acetate in the following manner. To a vigorously stirred solution of 1 g. of 6-dehydroprednisone 21-acetate in 350 ml. of methylene chloride, there is added 3 drops of a 4 solution of hydrobromic acid in acetic acid followed by the dropwise addition, over a 35 minute period, of 0.41 g. of bromine in 40 ml. of methylene chloride. The organic solution is then washed with water (50 ml.) sodium carbonate (50 ml.) and again with water. The organic solution is dried over magnesium sulfate, filtered and evaporated to a residue comprising 6,7-dibromoprednisone 21-acetate. This residue is used without further purification in the following procedure.

To the dibromide prepared above, there is added under argon gas 20 ml. of 2,4-lutidine and the mixture is heated at 90–95° C. for 3½ hours. The reaction mixture is then cooled and poured into a slight excess of dilute ice-chilled aqueous sulfuric acid and the acidified mixture is extracted twice with methylene chloride. The organic extracts are combined, washed with water, dried over magnesium sulfate and filtered. The filtrate is evaporated to a small volume (3 ml.) and poured onto a magnesium silicate column (40 g.) saturated with hexane. The fractions eluted with 40–50% of ether in hexane are combined and evaporated to a residue which is crystallized from acetone-hexane to give 6-bromo-6-dehydroprednisone 21-acetate, 241–242° C.

EXAMPLE 11

*6-Bromo-6-Dehydroprednisolone 21-Acetate*

The requisite intermediate, 6,7-dibromoprednisolone 21-acetate, is prepared from 6-dehydroprednisolone 21-acetate and bromine in methylene chloride in the manner described in Example 10.

6,7-dibromoprednisolone 21-acetate, prepared as described above, is reacted with 2,4-lutidine in the manner described in Example 10 and the resultant product isolated and purified in the described manner to give 6-bromo-6-dehydroprednisolone 21-acetate.

EXAMPLE 12

*6-Bromo-9α-Fluoro-6-Dehydroprednisone 21-Acetate*

The intermediate, 6,7-dibromo-9α-fluoroprednisone 21-acetate, is prepared in the manner of Example 10 from 9α-fluoro-6-dehydroprednisone 21-acetate and bromine in methylene chloride and is reacted with 2,4-lutidine under argon gas in the manner described in Example 10 to give 6-bromo-9α-fluoro-6-dehydroprednisone 21-acetate.

EXAMPLE 13

*6-Bromo-9α-Fluoro-6-Dehydroprednisolone 21-Acetate*

6,7-dibromo-9α-fluoroprednisolone 21-acetate, is prepared by brominating 9α-fluoro-6-dehydroprednisolone 21-acetate in the manner described in Example 10 and is then dehydrobrominated with 2,4-lutidine in the manner described to give 6-bromo-9α-fluoro-6-dehydroprednisolone 21-acetate.

EXAMPLE 14

*6,9α-Dibromo-6-Dehydroprednisolone 21-Acetate*

The requisite intermediate, 6-bromo-9β-11β-epoxy-17α, 21-dihydroxy-1,4-pregnadiene-3,20-dione 21-acetate, is prepared in the manner of Example 5 from 9β,11β-epoxy-17α,21-dihydroxy-1,4-pregnadiene-3,20-dione 21 - acetate and N-bromosuccinimide and is then dissolved in 200 ml. of 2,4-lutidine and reacted in the manner of Example 5 to give 9β,11β - epoxy-17α,21-dihydroxy-1,4,6-pregnatriene-3,20-dione 21-acetate.

6,7-dibromo-9β,11β-epoxy-17α,21-dihydroxy-1,4 - pregnadiene-3,20-dione 21-acetate, is prepared in the manner of Example 1 by brominating 9β,11β-epoxy-17α,21-dihydroxy-1,4,6-pregnatriene-3,20-dione 21-acetate.

The 6,7-dibromo-9β,11β-epoxy compound thus prepared is dissolved in 100 ml. of acetone and 4 g. of potassium acetate added. The reaction mixture is refluxed 20 hours, then evaporated to dryness. The resultant residue is triturated with water, filtered, washed further with water, dried, then crystallized from acetone to give 6-bromo-9β,11β-epoxy-17α,21-dihydroxy-1,4,6 - pregnatriene - 3,20 - dione 21-acetate.

EXAMPLE 15

6-Fluoro-16α-Methyl-6-Dehydrohydrocortisone

The requisite intermediate, 16α-methylhydrocortisone 21-acetate, is prepared from 16-pregnene-3α-ol-11,20-dione in the manner described in co-pending application Serial No. 733,843 of Rausser et al., filed May 8, 1958, and is added to 450 ml. of acetic acid. The reaction mixture is saturated with argon gas and the solution warmed to approximately 85–90° C. Trifluoroacetic anhydride (90 ml.) is added and the temperature maintained at 85–90° C. for 45 minutes. The reaction solution is cooled, poured into 10 l. of cold water and allowed to stand for one hour. A solid precipitates which is filtered, washed three times with water, dried at 60° C. and then crystallized from acetone-hexane to give 16α-methylhydrocortisone triacetate.

The triacetate is reacted with N-bromosuccinimide in carbon tetrachloride under an atmosphere of nitrogen and the resultant product isolated and purified to give 6-bromo-16α-methylhydrocortisone triacetate.

The 6-bromo-16α-methylhydrocortisone triacetate is reacted with 2,4-lutidine and the resultant product isolated and purified to give 16α-methyl-6-dehydrohydrocortisone triacetate.

16α - methyl-6-dehydrohydrocortisone triacetate is reacted with hydrogen fluoride and N-bromoacetamide in methylene chloride, and the resultant product isolated and purified in the manner to give 6-fluoro-7-bromo-16α-methylhydrocortisone triacetate.

6 - fluoro-7-bromo-16α-methylhydrocortisone triacetate is reacted with 2,4-lutidine under argon gas and the resultant product isolated and purified to give 6-fluoro-16α - methyl - 6 - dehydrohydrocortisone triacetate. This triacetate is hydrolyzed to the corresponding trihydroxy compound with the aid of a culture of *Flavobacterium dehydrogenans* (Rutgers University Collection No. 130).

The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under sterile conditions into a sterile medium of pH 6.8 and having the following composition:

| | Gm. |
|---|---|
| Yeast extract (Difco) | 10 |
| Potassium phosphate monobasic | 4.48 |
| Sodium phosphate dibasic | 4.68 |
| Tap water to 1 liter. | |

This culture medium has previously been autoclaved, as at 15 lb. pressure, for twenty minutes to obtain aseptic conditions, and cooled. The variant is grown in the medium under constant illumination, using the visible range of the spectrum. The incubation temperature is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 6-fluoro-16α-methyl-6-dehydrohydrocortisone triacetate dissolved in a minimum volume of ethanol. The reaction mixtures are then shaken at 30° C. for 12 to 48 hours. The reaction is stopped when paper chromatography indicates that the starting material has been transformed.

The contents of the flasks are combined and extracted with methylene chloride. The extracts are concentrated to a residue which is crystallized from acetone-hexane to give 6-fluoro-16α-methyl-6-dehydrohydrocortisone.

EXAMPLE 16

6-Bromo-16α-Methyl-6-Dehydrohydrocortisone (A) 6,7-DIBROMO-16α-METHYLHYDROCORTISONE TRIACETATE In the manner described in Example 1, 16α-methyl-6-dehydrohydrocortisone triacetate is brominated and the resultant product isolated and purified to give 6,7-dibromo-16α-methylhydrocortisone triacetate.

(B) 6-BROMO-16α-METHYL-6-DEHYDROHYDROCORTISONE TRIACETATE 6,7-dibromo-16α-methylhydrocortisone triacetate is reacted with 2,4-lutidine and the resultant product isolated and purified in the manner described in Example 1 to give 6-bromo-16α-methyl-6-dehydrohydrocortisone triacetate.

EXAMPLE 17

6-Chloro-16α-Methyl-6-Dehydrohydrocortisone

16α - methyl - 6-dehydrohydrocortisone triacetate is chlorinated and the resultant product isolated and purified in the manner described in Example 3 to give 6,7-dichloro-16α-methylhydrocortisone triacetate.

The 6,7-dichloro-4-pregnene is reacted with 2,4,6-collidine and the resultant product isolated and purified in the manner described in Example 3 to give 6-chloro-16α-methyl-6-dehydrohydrocortisone triacetate.

The triacetate is subjected to the action of a culture of *Flavobacterium dehydrogenans* and the resultant product isolated and purified in the manner described in Example 15 to give 6 - chloro-16α-methyl-6-dehydrohydrocortisone.

EXAMPLE 18

6-Bromo-16β-Methyl-6-Dehydrohydrocortisone 21-Acetate

16β-methylhydrocortisone is reacted with acetic acid and trifluoroacetic anhydride in the manner described in Example 15 and the resultant product isolated and purified in the described manner to give 16β-methylhydrocortisone triacetate.

16β-methylhydrocortisone triacetate is reacted with N-bromosuccinimide in carbon tetrachloride under an atmosphere of nitrogen and the resultant product isolated and purified in the manner described in Example 5 to give 6-bromo-16β-methylhydrocortisone triacetate.

6 - bromo - 16β-methylhydrocortisone triacetate is reacted with 2,4-lutidine and the resultant product isolated and purified to give 16β-methyl-6-dehydrohydrocortisone triacetate.

16β-methyl-6-dehydrohydrocortisone triacetate is brominated and the resultant product isolated in the manner described in Example 1 to give 6,7-dibromo-16β-methylhydrocortisone triacetate.

The 6,7-dibromo compound is reacted with 2,4-lutidine and the resultant product isolated and purified in the manner of Example 1 to give 6-bromo-16β-methyl-6-dehydrohydrocortisone triacetate.

The triacetate is hydrolyzed to the corresponding alcohol with the aid of a culture of *Flavobacterium dehydrogenans* and the resultant product isolated and purified in the manner of Example 15 to give 6-bromo-16β-methyl-6-dehydrohydrocortisone.

EXAMPLE 19

6-Fluoro-16β-n-Butyl-6-dehydrocortisone 21-Acetate

The requisite intermediate, 16β-n-butylcortisone 21-acetate, is prepared in the manner described in co-pending application Serial No. 733,843 of Rausser et al., filed May 8, 1958.

16β-n-butylcortisone 21-acetate is reacted with N-bromosuccinimide in the manner described in Example 5 to give 6-bromo-16β-n-butylcortisone 21-acetate.

6-bromo-16β-n-butylcortisone 21-acetate is reacted with 2,4-lutidine and the resultant product isolated and purified to give 16β-n-butyl-6-dehydrocortisone 21-acetate. This is reacted with hydrogen fluoride and N-bromoacetamide in methylene chloride and the resultant product isolated and purified to give 6-fluoro-7-bromo-16β-n-butylcortisone 21-acetate. 6-fluoro-7-bromo-16β-n-butylcortisone 21-acetate is reacted with 2,4-lutidine over argon gas and the resultant product isolated and purified to give 6-fluoro-16β-n-butyl-6-dehydrocortisone 21-acetate.

EXAMPLE 20

*6-Bromo-16α-Methyl-6-Dehydroprednisolone*

The requisite intermediate, 16α-methylprednisolone 21-acetate (prepared in the manner described in co-pending application Serial No. 733,843 of Rausser et al., filed May 8, 1958) is reacted with acetic acid and trifluoroacetic anhydride to give 16α-methylprednisolone triacetate. The triacetate is reacted with N-bromosuccinimide in carbon tetrachloride under an atmosphere of nitrogen and the resultant product isolated and purified to give 6-bromo-16α-methylprednisolone triacetate.

The 6-bromo compound reacted with 2,4-lutidine and the resultant product isolated and purified to give 16α-methyl-6-dehydroprednisolone triacetate. This triacetate is brominated in the manner of Example 1 to give 6,7-dibromo-16α-methylprednisolone triacetate.

In the manner described in Example 1, the 6,7-dibromide is reacted with 2,4-lutidine and the resultant product isolated and purified to give 6-bromo-16α-methyl-6-dehydroprednisolone triacetate which is hydrolyzed to the corresponding alcohol with the aid of a culture of *Flavobacterium dehydrogenans* and the resultant product isolated and purified to give 6-bromo-16α-methyl-6-dehydroprednisolone.

EXAMPLE 21

*Hydrolysis of the 21-Esters*

As described in the preceding examples the 6,7-dihalo compounds of this invention are prepared in the form of their 21-lower alkanoyl esters, preferably acetates. These esters are hydrolyzed to the corresponding 21-ol as follows:

Dissolve 140 mg. of the 21-ester in 9.8 ml. of methanol and cool to 0° C. Add 2.5 ml. of 70% perchloric acid. Keep reaction mixture at 0° C. for 3 hours while stirring. Dilute with water, separate the organic phase and evaporate to a residue in vacuo at about 10° C. Purification of the 21-ol is effected by crystallization with hexane.

We claim:

1. A compound of the group consisting of 4-pregnene and 1,4-pregnadiene having a keto group at each of the 3- and 20-positions, a 17α-hydroxy group, at the 21-position a member of the group consisting of hydroxy and lower alkanoyloxy, at the 9α-position a member of the group consisting of hydrogen and halogen of atomic weight less than iodine, at the 11-position a member of the group consisting of keto and β-hydroxyl, at the 16-position a member of the group consisting of hydrogen and lower alkyl and characterized by a halogen substituent at C-7 and a halogen substituent of atomic weight less than iodine at C-6.
2. 6-Z, 7-Z'-cortisone wherein Z' is halogen and Z is halogen of atomic weight less than iodine.
3. A 21-lower alkanoate of a compound of claim 2.
4. 6-Z, 7-Z'-hydrocortisone wherein Z' is a halogen and Z is halogen of atomic weight less than iodine.
5. A 21-lower alkanoate of a compound of claim 3.
6. 6-Z, 7-Z'-prednisone wheerin Z' is a halogen and Z is halogen of atomic weight less than iodine.
7. A 21-lower alkanoate of a compound of claim 6.
8. 6-Z, 7-Z'-prednisolone wherein Z' is a halogen and Z is halogen of atomic weight less than iodine.
9. A 21-lower alkanoate of a compound of claim 8.
10. 6-Z, 7-Z'-9α-fluoroprednisolone wherein Z' is halogen and Z is halogen of atomic weight less than iodine.
11. A 21-lower alkanoate of a compound of claim 10.
12. A compound of the group consisting of 16-A-6-Z, 7-Z'-9β,11β-oxido-1,4-pregnadiene-17α,21-diol-3,20-dione, 16-A-6-Z, 7-Z'-9β,11-oxido-4-pregnene-17α,21-diol-3,20-dione and the 21-lower alkanoyl esters thereof wherein A is a member of the group consisting of H and lower alkyl, Z is halogen of atomic weight less than iodine and Z' is halogen.
13. 6,7-dibromocortisone 21-acetate.
14. 6,7-dibromohydrocortisone 21-acetate.
15. 6,7-dichlorocortisone 21-acetate.
16. 6-fluoro-7-bromocortisone 21-acetate.
17. 6,7-dibromo-9α-fluorohydrocortisone 21-acetate.
18. 6,7-dibromoprednisone 21-acetate.
19. 6,7-dibromoprednisolone 21-acetate.
20. 6,7-dibromo-9α-fluoroprednisolone 21-aceate.

No references cited.